3,250,800
PROCESS FOR THE PREPARATION OF 2-PHENYL-
HYDRAZINO-2,2-DIALKYLNITRILE
John J. Godfrey, Silver Spring, Md., assignor to W. R.
Grace & Co., a corporation of Connecticut
No Drawing. Filed Sept. 19, 1963, Ser. No. 310,130
3 Claims. (Cl. 260—465)

This invention relates to a novel high-temperature free radical source. In one specific aspect, it relates to a novel method for preparing said high-temperature free radical source in such a way as to give high yields by an economic process.

Polymers of ethylene such as those described in U.S. Patent Number 2,153,553 and in U.S. Patent Number 2,816,883 are well-known in the art today and are generally characterized by their organic solvent solubility and their thermoplastic properties. Lately, several methods have been tried with varying success to decrease their thermoplasticity and solubility by crosslinking the polymer. Such methods include electron impingement of the polymer and blending of free radical liberating substances into the polymer. In regard to the aforesaid latter method of polymer crosslinking, the main classes of compounds which have been utilized as crosslinking agents are organic peroxides and bisperoxides. Although it is known that various organic peroxides will cause crosslinking upon admixture with polyethylene, many have been found lacking in certain regards. Thus, for example, benzoyl peroxide at the necessary blending temperatures is a hazard due to its capacity to decompose violently. Still other peroxides lack a sufficiently long life at the temperature of incorporation into the softened ethylene polymer to permit uniform crosslinking therein.

The advent of high density polyethylene, i.e., 0.94–0.97 g./cc., described in U.S. Patent Number 2,816,883, which has a melting point of at least 127° C., has created many problems in the crosslinking art. One of the problems plaguing the high density polymer industry is the necessity of a crosslinking agent which can be incorporated into a molten ethylene polymer in a shaping operation, e.g., extrusion, without decomposing and which would, after shaping, cause crosslinking of the polymer in a curing operation at higher temperatures. The high melting point of the high density ethylene polymer makes it very difficult to use peroxides well-known in the art as crosslinking agents. This is due to the peroxide's having an excessive decomposition rate at the softening point of the ethylene polymer, thereby crosslinking the polymer to a high degree so rapidly that compounding, molding, or extruding operations are impossible on a commercial scale.

Recently, a novel group of crosslinking agents has been described. This group comprises $\alpha$-phenylazonitriles having one or more substitutions on the carbon atoms marked $\beta$ and $\beta'$ below, of the formula (1)

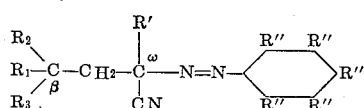

where R″ is a member of the group consisting of hydrogen, halogen, alkyl, aralkyl, aryl, and any combination thereof, $R_1$ and $R_4$ are hydrogen or alkyl, and $R_2$, $R_3$, $R_5$, and $R_6$ are alkyls but not necessarily the same alkyl. The group also includes arylazoalkylnitriles having the following configurations, in which there may be a substitution on the $\beta$ carbon:

(2)

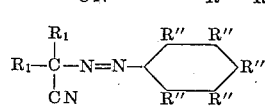

(3)

where R″ is the same as above, R′ is an alkyl group, $R_1$ is hydrogen or alkyl, and $R_2$ and $R_3$ are alkyls but not necessarily the same alkyl, such as methyl, ethyl, propyl, and the like. These compounds have been shown to be effective crosslinking agents capable of admixture with polyethylene (even high density polyethylene) above its softening point, which can cause crosslinking thereof after shaping, in a subsequent curing operation at higher temperatures. Of particular interest is the compound 2-phenylazo-2-isobutyl-4-methylvaleronitrile (PIM), owing to its decomposition temperatures and other desirable properties.

It should be noted that in describing the above-identified compounds, I have assumed that the $a$-carbons (see Formulae 1 and 2) have two hydrogen atoms each. While branching in the $\beta$-position is necessary for best crosslinking results, branching in the $a$-position is relatively ineffective in enhancing the cross-linking characteristics of the compound. However, such branching, i.e., substitution of alkyl radicals, in the $a$-position is not harmful, and such compounds may also be readily prepared by the process described below.

Several methods of preparing these compounds have been described. Generally speaking, these methods involve mixing a dialkylketone with phenylhydrazine in benzene to yield dialkylketone phenylhydrazone. This product is then reacted at temperatures below the boiling point of hydrogen cyanide (25.7° C.) and under atmospheric conditions with liquid hydrogen cyanide in the presence of a truce of acid resulting in the formation of an 2-phenylhydrazo-nitrile. This compound is then dissolved in chloroform and oxidized to the corresponding azo-nitrile with air or chlorine gas. The principal drawback to these methods is that yields are generally low, in the order of 20%, and further, the desired product is diluted with the unreacted hydrazo compound.

It is an object of this invention, therefore, to provide new and different economical processes for the production of azonitrile crosslinking agents. It is a further and more specific object of this invention to provide a process for the 2-phenylazo-2,2-dialkylnitriles wherein high yields of desired products are obtained.

I have found that these objects are achieved by employing controlled temperatures and pressures in the conversion of dialkylketone phenylhydrazone to 2-phenylhydrazo-2,2,-dialkylnitrile with hydrogen cyanide, and recycling unconverted hydrazone.

Also, I have found that the main cause of low yields in processes known heretofore is the rapid reversion of the phenylhydrazo-nitrile to the phenylhydrazone accompanied by the loss of hydrogen cyanide; the phenylhydrazo-nitrile is stable only in a dry, crystalline state. Because of this poor stability, the equilibrium conversion of the phenylhydrazones to phenylhydrazo compounds tends to be quite low, even in the presence of large excesses of hydrogen cyanide. I have found that this difficulty may be overcome by immediately separating the phenylhydrazo-nitrile from all contaminants, i.e., solvent, hydrogen cyanide, and unreacted phenylhydrazone, and keeping the solid phenylhydrazo-nitrile virtually dry and solvent free. By immediately, I mean that the phenylhydrazo-nitrile must be removed as soon as it is formed. For small batch procedures, this should be a matter of a few minutes for optimum results. For larger scale, once the reaction has neared completion, no more than an hour should elapse before total removal of the phenylhydrazo-nitrile is effected. It is occasionally possible to increase the yield of phenylhydrazo compound by the use of low temperatures, in the range of 0° C. Such temperatures depresses the solubility and hence favor the crystallization of the desired phenylhydrazo compound, thereby effecting a shift in the chemical equilibrium in a favorable direction. However, such a procedure has numerous drawbacks, the primary one being the length of time necessary for the reaction to reach completion (a minimum of several days is required). Accordingly, I have found that highly successful results can be obtained where temperatures in the order of 60° C. are used, and the unreacted phenylhydrazone is immediately separated from the phenylhydrazo-nitrile and reacted with additional hydrogen cyanide. Again, the critical step is the immediate separation of the phenylhydrazo compounds from solvent and reactants.

Finally, the phenylazo-nitrile is produced by oxidizing the phenylhydrazo-nitrile with a halogen in the presence of cold ethanol. In the preferred embodiment of my procedure, the phenylhydrazo-nitrile is not stored, but is immediately oxidized to the corresponding azo compound.

My invention can be further understood by the following description:

The appropriate dialkylketone phenylhydrazone is prepared by any convenient method. I have found the method described below entirely satisfactory but any other process giving an adequate yield is equally suitable. A predetermined quantity of dialkylketone is combined with an approximately equal molar quantity of phenylhydrazine and several drops of acid catalyst in an organic solvent such as benzene or toluene. The mixture is refluxed under a blanket of nitrogen and the water is removed and measured until the theoretical amount of water is obtained in accordance with the following reaction:

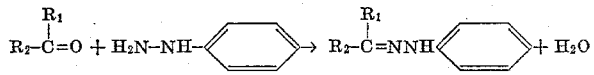

where $R_1$ and $R_2$ are alkyl radicals, but not necessarily the same radical. Thereafter the solvent is removed by distillation and the resulting phenylhydrazone distilled at about 115° C. and about 0.5 mm. The crude product thus obtained can be purified by redistillation. It should be restored under the inert atmosphere to prevent rapid autoxidation.

The dialkylketone phenylhydrazone is then used to prepare 2-phenylhydrazo-2,2-dialkylnitrile. This is accomplished by combining the hydrazone with approximately equal volume of liquid hydrogen cyanide at about 60° and about 30 p.s.i. gage. Temperatures appreciably higher will unduly effect decomposition of the product as it is formed. Successful results are obtained at room temperature, but the reaction time must be somewhat increased. The mixture is stirred continuously and maintained at this temperature and pressure for about 40–70 hours, after which it is opened to atmospheric conditions. Most of the hydrogen cyanide is evaporated from the resulting composition; this hydrogen cyanide is trapped by conventional techniques and recovered for the recycle described below.

Solvent, such as pentane, is generally added to aid in the removal of oily, unconverted hydrazone from the crystalline phenylhydrazino-nitrile, which formed when the hydrogen cyanide was removed. This solvent is removed by filtration, and is reserved for recycle. Also, it is helpful to add water to remove any traces of the hydrogen cyanide. Thereafter, the crystals are filtered dry.

It is advisable to triturate the filter cake with cold solvent and filter and vacuum dry the product. The filtrate can then be placed in a film evaporator where much of the solvent is stripped off under vacuum at about 30° C. The resulting concentrate is reacted as before under pressure with liquid hydrogen cyanide. The hydrogen cyanide adduct is recovered as before.

If desired, the remaining hydrazone present in the filtrate from the recycle can be recycled still another time to yield a larger quantity of product.

EXAMPLE I

A. *Preparation of diisobutylketone phenylhydrazone*

Into a 5-liter, 3 neck flask fitted with a mechanical stirrer, Dean-Stark trap, thermometer and nitrogen inlet was placed 1,050 g. (7.4 moles) of diisobutylketone, 741 g. (6.85 moles) of phenylhydrazine, 2 liters of toluene and 30 g. (wet weight) of anhydrous sulfonic acid resin slurried in toluene ("Amberlyst 15" supplied by Rohm & Haas Company). The mixture was refluxed with stirring under a blanket of nitrogen; the water was separated rapidly in 1.5 to 2 hours. The reaction mixture was cooled under nitrogen and decanted from the resin into a claisen type vacuum distillation apparatus. The toluene was distilled off and 1475 g. (93%) of the phenylhydrazone was collected at 115° C. and about 0.5 mm. The phenylhydrazone was stored under an inert atmosphere.

*Analysis.*—Calculated for $C_{15}H_{24}N_2$: C, 77.53; H, 10.41; N, 12.06. Found: C, 77.39; H, 10.50; N, 11.99.

B. *Preparation of 2-phenylhydrazo-2-isobutyl-4-methylvaleronitrile*

Hydrogen cyanide addition was run in 12 ounce pressure bottles equipped with a ⅛ inch valve adapter (supplied by the Fischer & Porter Co.); a pressure of 30 p.s.i. gage was used. The bottles were loaded with 232 g. (1.0 mole) of diisobutylketone phenylhydrazone, 81 g. (3.0 moles) of hydrogen cyanide (supplied by American Cyanamid Co.) and a Teflon clad magnetic stirring bar. After stirring at room temperature (about 25° C.) for 60 hours the reaction mixture was poured into a beaker containing 300 ml. of pentane and the hydrogen cyanide evaporated with a strong current of nitrogen over the surface. The reaction mixture solidified when most of the hydrogen cyanide (a good solvent for the hydrazo compound) had evaporated. The mixture was mixed with ice and water and pressed dry on a filter. The solid was titurated with a 200 ml. of portion of cold pentane filtered and vacuum dried at room temperature, yield—142 g. (55%) of white solid, melting point 80–81° C. No recycle was run in this experiment.

It was found that the hydrazino compound was stable at room temperature for long periods of time when pure and dry; if all of the unconverted phenylhydrazone was not removed, or if phenylhydrazino formed from decomposition of the wet hydrazo compound, the white crystals obtained rapidly darkened and disintegrated. All attempts at recrystallization resulted in large losses of products with no measurable increase in purity.

*Analysis.*—Calculated for $C_{16}H_{25}N_3$: C, 74.08; H, 9.71; N, 16.0. Found: C, 74.15; H, 9.40; N, 16.43.

C. *Preparation of 2-phenylazo-2-isobutyl-4-methylvaleronitrile*

A mixture of 25.9 g. (0.1 mole) of phenylhydrazonitrile in 100 ml. of absolute ethanol was maintained with stirirng at 0° C. while a solution of 24 g. (0.15 mole) of bromine in 100 ml. of absolute ethanol was added dropwise in 3–4 minutes. The bromine solution was made up by adding cold bromine to cold ethanol and maintaining the temperature of the mixture at 0° C. or lower. This solution was used immediately after preparation.

Upon completion of bromine addition, chipped ice was added and the reaction mixture set up to a thick slurry of yellow crystals. The product was collected on a filter and washed with ice water. (The crystaline product was kept cold until all of the ethanol had been washed out.) The azo compound was dissolved in 100 ml. of petane separated from the aqueous layer, dried by swirling with anhydrous magnesium sulfate for a few minutes and filtered; a pentane wash of the magnesium sulfate was combined with the filtrate. The combined solution was made up to a volume of 300 ml. with pentane and cooled to Dry Ice temperature. When the solution had solidified, powdered Dry Ice was stirred in and the mixture poured over powdered Dry Ice on a fritted glass filter. The filter cake was pressed under vacuum until dry at room temperature. Vacuum drying at room temperature gave 25 g. (97% yield) of the yellow azo compound, melting point 31–32° C. This material was stored in the dark to prevent photo decomposition. The final chemical composition of the product was confirmed by ultraviolet adsorption spectral analysis.

EXAMPLE II

The procedure used in Example I was entirely followed except that chlorine was substituted for bromine in the formation of the azo compound. In a 500 ml. 3 neck flask fitted with thermometer, stirred and fritted-disc gas inlet tube were placed 25.9 g. (0.1 mole) of the phenylhydrazo-nitrile compound and 200 ml. of absolute ethanol. An excess of chlorine was rapidly passed into the flask at 0° C. and the reaction mixture was poured over chipped ice. The remainder of the procedure used for bromine oxidation was used. Final yield was 21 g. (87%) of azo compound, melting point 31–32° C.

*Analysis.*—Calculated for $C_{16}H_{23}N_3$: C, 74.67; H, 9.01; N, 16.32. Found C, 74.61; H, 8.71; N, 16.22.

EXAMPLE III

The same procedure was used as in Example I except that the pressurized reaction between the phenylhydrazone and hydrogen cyanide was carried out at 60° C. and the reaction time reduced to 40 hours; no recycle was performed. A conversion of hydrazone to hydrazo compound of 33% was obtained.

EXAMPLE IV

*Preparation of diisobutylketone phenylhydrazone*

In a 5-liter flask fitted with a Dean-Stark trap was placed 853 g. (6.0 moles) of 2,6-dimethyl-4-heptanone (Eastman practical grade), 649 g. (6.0 moles) phenylhydrazine (Fischer certified reagent), 1 liter of benzene and 30 grams of Amberlyst 15. The mixture was refluxed and the water removed continuously and measured by the Dean-Stark trap. After the theoretical amount of water had been collected, the system was arranged for distillation; the benzene was stripped off and the product distilled at 0.5 mm. Hg. The crude product was redistilled through a 3-foot spinning-band column; after a large forerun the hydrazone was collected, B.P. 115° C./0.5 mm.

*Preparation of 2-phenylhydrazo-2-isobutyl-4-methyl-valeronitrile*

To 165 g. diisobutylketone phenylhydrazone and 1 g. p-toluene-sulfonic acid in 12 ounce aerosol bottles maintained at 60° C. and about 30 p.s.i.g. was added an equal volume of liquid hydrogen cyanide. A magnetic stirring bar was placed in the bottle, and the bottle was closed and placed in a constant-temperature oil bath at 60° C. The mixture was stirred magnetically throughout the reaction. After 45 hours the aerosol bottle was removed from the oil bath, cooled to room temperature, and opened. The reaction mixture was poured into 200 ml. of hexane, and the excess hydrogen cyanide was evaporated; 100 ml. of 20% $NH_4OH$ was added. The organic layer was immediately separated, washed with distilled water, and passed through a fluted filter. Any crystals found on the filter were dissolved in hexane. The filtrate was cooled in ice, the crystals collected on a Buchner funnel and washed with cold hexane. After vacuum drying, the adduct weighed 52 g., M.P. 80–81° C.

The remaining mother liquor was placed in a film evaporator where the hexane was stripped off under vacuum at about 30° C. The concentrate weighed 155 g. The concentrate and 1 g. p-toluenesulfonic acid were placed in the aerosol bottle with an equal volume of hydrogen cyanide. The reaction mixture was heated and stirred as before, this time for 24 hours. The hydrogen cyanide adduct was recovered as before, weight—34 g., M.P. 80–81° C.

The remaining mother liquor was again recycled yielding 41 g., M.P. 80–81° C. The total yield of hydrazonitrile including the original yield and two recycles was 127 g., 69% based on the hydrazone.

*Preparation of 2-phenylazo-2-isobutyl-4-methyl-valeronitrile*

A mixture of 25.9 g. (0.10 mole) of the above hydrazonitrile and 100 ml. ethanol in a 511 ml. Erlenmeyer flask was cooled in an ice bath and stirred magnetically. A solution of 24 g. of (0.15 mole) bromine in 100 ml. ethanol (ice-cold bromine was added to ice-cold ethanol and used immediately) was added dropwise in 3–4 minutes. Immediately upon completion of bromine addition, chipped ice was added to the flask. The reaction mixture soon set to a thick slurry of yellow crystals. The mixture of ice and azo-nitrile was collected on a filter and washed with ice water.

This azo-nitrile is extremely soluble in most of the common solvents including hexane. It could not be crystallized from alcohol-water; addition of water to an ethanolic solution resulted only in oiling out. It can however, be conveniently recrystalilzed from n-hexane. The azo-nitrile was dissolved in 100 ml. hexane, decanted from the water layer, dried by swirling over anhydrous magnesium sulfate for a few minutes, and filtered through a fritted-glass filter. The magnesium sulfate was washed with hexane; the washings were filtered and combined with the original solution. The combined solutions of about 300 ml. were cooled in Dry Ice. When the solution had solidified, powdered Dry Ice was stirred in and the mixture poured over powdered Dry Ice on a fritted-glass filter. The filter cake was pressed under suction until dry at room temperature. After vacuum drying at room temperature, there resulted 25 g. (97% yield) of azo compound, M.P. 31–32° C.

EXAMPLE V

The same procedure was used for the preparation of 2-phenylhydrazo-2-isobutyl-methylvaleronitrile as in Example IV. Also, generally speaking, the same procedure was used for the preparation of 2-phenylazo-2-isobutyl-valeronitrile, except that chlorine was substituted for bromine. The oxidation was run in a 500 ml. 3-neck flask fitted with thermometer, stirrer and a fritted-disc gas inlet tube. The flask was cooled in an ice bath. Chlorine was bubbled into a mixture of 25.9 g. (0.10 mole) hydrazonitrile in 200 ml. ethanol at about 5°. The reaction mixture was poured onto chipped ice, the ice and azo-nitrile collected on a filter and washed with ice water. Recrystallization from hexane as described in Example I gave 21 g. (87% yield) azo-nitrile, melting point 31–32° C.

The identity of the products of Examples I and II was confirmed by infrared and ultraviolet absorption analysis. Further, the calculated analysis for 2-phenylazo-2-isobutyl-4-methyl-valeronitrile ($C_{16}H_{23}N_3$) is: C, 74.67; H, 9.01; N, 16.32. The final products of both examples had the following analysis: C, 74.61; H, 8.71; N, 16.22.

From the foregoing description, it can be appreciated that I have been successful in devising a novel economic procedure for synthesizing 1-phenylazonitriles, involving in part, a novel procedure for the formation of 1-phenyl-hydrazonitriles as intermediates so as to provide for optimum yield of the desired products.

I claim:
1. In the process for preparing a 2-phenylhydrazino-2,2-dialkylnitrile from a corresponding dialkylketone phenylhydrazone by reacting said dialkylketone phenylhydrazone with hydrogen cyanide, the improvement which comprises immediately separating said 2-phenylhydrazino-2,2-dialkylnitrile from the reaction mixture, drying said compound, and maintaining said compound in a dry, solid state.

2. In the process for preparing a 2-phenylhydrazino-2,2-dialkylnitrile from a corresponding dialkylketone phenylhydrazone by reacting said dialkylketone phenylhydrazone with hydrogen cyanide, the improvement which comprises the steps of:
  (a) combining said dialkylketone phenylhydrazone with an approximately equal volume of liquid hydrogen cyanide at from about 25° to about 60° C., and at about 30 p.s.i.g.;
  (b) stirring the mixture thereformed under the aforesaid conditions for from 40 to 70 hours;
  (c) opening said mixture to atmospheric conditions;
  (d) immediately pouring said mixture into a selected organic solvent thereby evaporating excess hydrogen cyanide;
  (e) immediately mixing the resulting slurry with ice and water;
  (f) immediately filtering said slurry;
  (g) drying the resulting filter cake;
  (h) recovering the solid 2-phenylhydrazino-2,2-dialkylnitrile as the filter cake; and
  (i) storing said 2-phenylhydrazino-2,2-dialkylnitrile free of solvent and moisture.

3. In the process for preparing a 2-phenylhydrazino-2,2-dialkylnitrile from a corresponding dialkylketone phenylhydrazone by reacting said dialkylketone phenyl-hydrazone with hydrogen cyanide, the improvement which comprises the steps of:
  (a) combining said dialkylketone phenylhydrazone with an approximately equal volume of liquid hydrogen cyanide at from about 25° C. to about 60° C., and at about 30 p.s.i.g.;
  (b) stirring the mixture thereformed under the aforesaid conditions for 40 to 70 hours;
  (c) opening said mixture to atmospheric conditions;
  (d) immediately pouring said mixture into a selected organic solvent thereby evaporating excess hydrogen cyanide;
  (e) immediately mixing the resulting slurry with ice and water;
  (f) filtering said slurry in such a way that the total time between the exposure of said mixture in step (c) above and the completion of the instant filtration step is less than one hour;
  (g) drying the resulting filter cake;
  (h) recovering solid 2-phenylhydrazino-2,2-dialkylnitrile as said filter cake; and
  (i) storing said 2-phenylhydrazino-2,2-dialkylnitrile free of solvent and moisture.

References Cited by the Examiner

UNITED STATES PATENTS

| | | | |
|---|---|---|---|
| 2,469,358 | 5/1949 | Alderson et al. | 260—465.5 |
| 2,471,959 | 5/1949 | Hunt | 260—89.5 |
| 2,877,102 | 3/1959 | Levesque | 44—57 |

OTHER REFERENCES

Thiele et al.: Annalen der Chemie, vol. 290 (1896), page 3.

CHARLES B. PARKER, *Primary Examiner.*

IRVING MARCUS, *Examiner.*

NORMA MILESTONE, *Assistant Examiner.*